Sept. 12, 1967     R. D. RUMSEY ETAL     3,340,966
COMBINATION CHECK VALVE AND SEAL
Filed Oct. 23, 1965
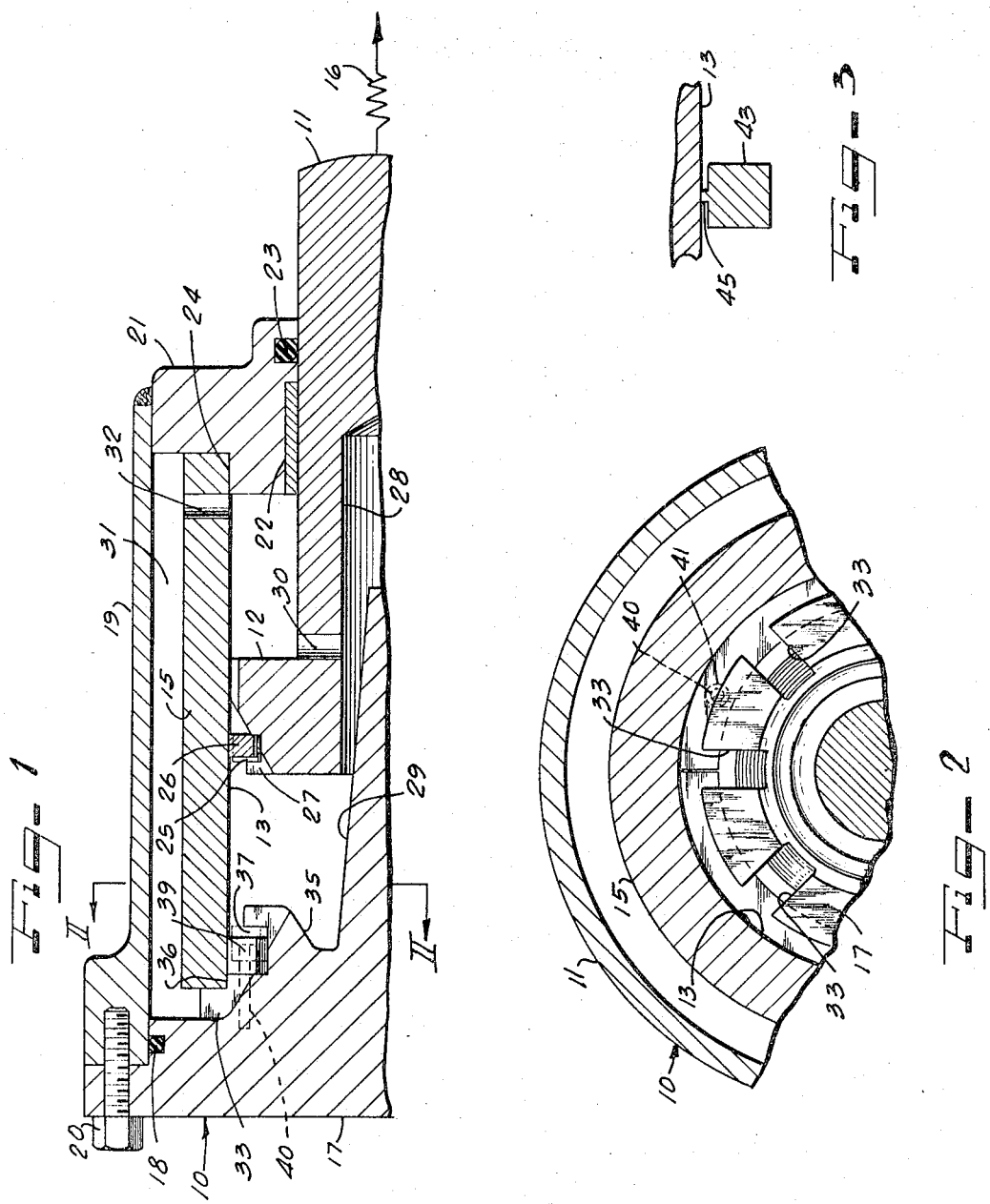
INVENTOR.
ROLLIN DOUGLAS RUMSEY
GORDON W. KAMMAN
BY *Hill, Sherman, Meroni, Gross & Simpson* ATTORNEYS United States Patent Office 3,340,966
Patented Sept. 12, 1967

3,340,966
COMBINATION CHECK VALVE AND SEAL
Rollin Douglas Rumsey and Gordon W. Kamman,
Buffalo, N.Y., assignors to Houdaille Industries, Inc.,
Buffalo, N.Y., a corporation of Michigan
Filed Oct. 23, 1965, Ser. No. 503,572
8 Claims. (Cl. 188—97)

ABSTRACT OF THE DISCLOSURE

Check valve and seal for hydraulic buffers in which the end closure for the buffer forms a slidable guide for a split ring type of check valve having sealing engagement with the interior wall of the buffer. The end closure for the buffer has flow passageways leading therethrough opening by movement of the ring away from the flow passageways upon expansion of the buffer and closed by movement of the ring into engagement with the passageways upon the exertion of buffing forces on the buffer. The gap between adjacent ends of the split ring forming the check valve forms a bleed passageway accommodating the bleeding of air through the check valve. A dowel fixed to the end closure and having slidable engagement with the split ring retains the gap at the top of the buffer to insure complete bleeding from the unit.

This invention relates to improvements in hydraulic buffers and more particularly relates to an improved check valve forming a seal for the buffer.

A principal object of the present invention is to provide a more compact and economical form of hydraulic buffer by utilizing the check valve of the buffer as a seal for the cylindrical wall of the working chamber of the buffer.

Another object of the invention is to provide a simplified form of check valve for a hydraulic buffer in which the check valve is annular in form and has relatively free slidable engagement with the interior cylindrical wall of the working chamber of the buffer and also forms an end seal for the working chamber.

A still further object of the invention is to provide a combined end seal and check valve for a hydraulic buffer in which the check valve is in the form of a split ring slidably mounted for engagement with the interior wall of the buffing cylinder and forming an end seal therefor, upon the taking up of buffing shock loads.

A further object of the invention is to provide an improved form of check valve and end seal for a hydraulic buffer in the form of a split ring slidably guided in the end closure member for the buffer in which the ring has a relatively small area annular sealing land projecting radially therefrom into slidable engagement with the interior cylindrical wall of the working chamber of the buffer, to facilitate movement of the check valve under extremely light pressures in axial directions.

A still further object of the invention is to provide an improved form of check valve and seal construction for hydraulic buffers and the like in which the end closure for the buffer forms a slidable guide for the check valve and has flow passageways leading therethrough opening upon expansion of the buffer and closed upon the exertion of buffing forces thereon, and in which the check valve is in the form of a split ring with the gap between adjacent ends of the ring retained at the top of the buffing cylinder, to form a bleed passageway accommodating the bleeding of air therethrough.

These and other objects of the invention will appear from time to time as the following specification proceeds and with reference to the accompanying drawings wherein:

FIGURE 1 is a longitudinal sectional view taken through a form of hydraulic buffer constructed in accordance with the principles of the present invention showing the upper half of the buffer in section;

FIGURE 2 is a partial fragmentary transverse sectional view taken substantially along lines II—II of FIGURE 1; and FIGURE 3 is a detail fragmentary longitudinal sectional view showing a section taken through the check valve and a portion of the buffer cylinder, and illustrating a modified form in which the invention may be embodied.

In the embodiment of the invention illustrated in the drawings, we have shown in FIGURES 1 and 2 a hydraulic buffer 10 of a form adapted to buff shock loads acting on the end of a piston rod 11 of the buffer. The piston rod 11 is shown as extending from a piston 12 slidably movable within an interior wall 13 of a buffing cylinder 15 and forming the working chamber of the buffer. A spring 16, which may be a compression spring, is provided to bias the piston 12 and piston rod 11 in extended relation with respect to the cylinder 15. The spring 16 is shown diagrammatically herein for purposes of simplicity in illustrating the invention, and usually is seated within the buffing cylinder 13 between the piston 12 and an adjacent end of an end cover 17 for a housing 19 for the buffer.

The housing 19 may be of a generally cylindrical form with the end cover 17 extending about one end and partially along the interior cylindrical wall of the housing and sealed thereto as by an O-ring 18. Cap screws 20 are shown as securing said end cover to said housing. The opposite end of the housing 19 is closed by an end closure 21 extending about the piston rod 11 and welded or otherwise secured to said housing. A bearing 22 recessed within the hollow interior of the end closure 21 forms a bearing for the piston rod 11. An O-ring seal 23 is recessed within the hollow interior portion of the end closure 21 and forms a seal for said piston rod.

The end closure 21 has an annular axial inwardly extending shoulder 24, along which the cylinder 15 extends. The cylinder 15 may be retained in position on the axially extending shoulder 24 in any conventional manner.

The piston 12 is freely slidable along the interior cylindrical wall 13 of the cylinder 15 and has an outwardly opening annular groove 25 formed therein forming a groove for a piston ring 26. The piston ring 26 may be a split ring and besides forming a seal for the interior wall of the cylinder 13 may also form a check valve, accommodating the flow of fluid through flow passageways 27 leading axially along said piston and opening to the periphery thereof, to facilitate free extension of the piston 12 and piston rod 11 by the spring 16.

The piston 12 and piston rod 11 also have an axially drilled passageway 28 extending therealong for a portion of the length of the piston rod 11 and opening to the inner face of the piston 12. A metering pin 29 is shown as extending axially inwardly from the cover 17 along the axially drilled passageway 28. The metering 29 with with the interior wall of the passageway 28 defines an annular flow restricting or damping orifice, decreasing in cross-sectional area as the piston 12 approaches the end cover 17. A cross-drilled passageway 30 accommodates the flow of hydraulic fluid to the back of the piston 12 and to a reservoir 31 through a cross-drilled passageway 32 leading radially through the cylinder 15. The reservoir 31 is shown as encircling the outer wall of the cylinder 15. Said reservoir forms a storage space for oil, to be supplied to the working chamber of the buffer defined by the interior cylindrical wall 13, through a plurality of axially extending flow slots 33 formed in an inwardly projecting end portion 35 of the end cover 17. The cylinder 15 is partially recessed in an outwardly and inwardly opening shouldered recess 36 formed in the inwardly projecting end portion 35 of the end cover 17. The flow slots 33 are shown in FIGURE 2 as extending radially and opening through an outwardly opening annular groove 37 in the inwardly projecting portion 35 of the cover 17.

The annular groove 37 forms a groove for a ring 39, slidably movable therealong and having slidable engagement with the interior wall 13 of the cylinder, to form a seal for the end of said cylinder and to also form a check valve, accommodating the flow of hydraulic fluid from the reservoir 31 into the working chamber of the buffer, and checking the flow of fluid from the working chamber of the buffer back into the reservoir through the flow slots 33, upon the creation of buffing forces on the buffer.

The check valve 39 may be a piston ring of a split type, which may be made from steel, bronze, aluminum or cast iron and is exactly ground to a size which may be the same or slightly smaller than the cylindrical wall 13 of the working cylinder, in order that it may freely move along the wall of the cylinder in axial directions under extremely light pressures.

The check valve 39 is shown as being retained in position with the gap between the adjacent ends of the ring at the top of the cylindrical wall 13, as by a dowel 40 loosely extending into a drilled passageway 41 extending axially into the ring. The dowel 40 is shown in FIGURE 1 as being mounted in the inwardly projecting portion 35 of the cover 17 and as extending axially therefrom into the ring groove. The dowel 40 has sufficient clearance with the wall of the passageway 41 to accommodate free movement of the check valve 39 along the piston ring groove 37 and retains the gap in the ring at the top of the cylindrical wall 13, to form an air bleed passageway for bleeding air from the working chamber of the buffer.

While the gap between the adjacent ends of the ring 39 provides a passageway through which some hydraulic fluid may leak, the gap can be made quite narrow. The leakage, therefore, will be negligible, particularly compared to the leakage that would occur if sufficient clearance were employed to make it possible to use a rigid ring. The gap between the adjacent ends of the ring also obviates the necessity of holding the outside diameter of the ring and the inside diameter of the working cylinder to close tolerances and enables the ring to readily conform to expansion of the cylindrical wall 13.

In FIGURE 3, I have shown a modified form of check valve in which a check valve ring 43 has a narrow land 45 extending radially therefrom and having slidable engagement with the interior wall 13 of the working cylinder 15. In this form of the invention, the narrow land 45 does the sealing while the outer face of the ring proper serves as a check valve. The surface contact between the ring and interior wall of the cylinder has been reduced by the provision of the land 45, with a view toward reducing the frictional forces between the ring and cylinder and increasing the sensitivity of the ring when moving to close the passageways 33. While the land 45 is shown as extending radially from the center of the outer face of the ring, it need not be so located but may be in any desired location along the outer face of the ring. It is, however, preferable that the land 45 be located close to the midpoint of the ring in order that there will be an appreciable force exerted on the ring to expand it and cause sealing under pressure load, and to enable it to readily follow the piston 12 out as the working chamber of the buffer expands.

The piston 12 and piston rod 11 are shown in FIGURE 1 in a mid-position of the buffer. The spring 16, therefore, normally biases the piston and piston rod into an extended position. External buffing forces on the end of the piston rod 11 thus tend to force the piston 12 inwardly toward the end cover 17 against the spring 16. As the piston 12 is moved inwardly toward the end cover 17, the check valve and sealing ring 39 will be forced into engagement with the outermost face of the groove 37 and seal the flow slots 33, preventing the back flow of fluid into the reservoir 31. As, however, the buffing forces are relieved, the spring 16 will move the piston 12 and piston rod 11 into an extended position toward the piston rod end of the cylinder 15. This will create a vacuum sufficient to move the check valve 39 along the groove 37 into engagement with the inner wall of said slot, and accommodate the damping fluid in the working chamber of the buffer, to be replenished through the flow slots 33, 33.

It may be seen from the foregoing that a new and improved check valve has been provided for a hydraulic buffer, which also serves as a seal for the working chamber of the buffer, and that the seal is in the form of a split pressure loaded metal ring, opening and expanding to follow the expansion of the working cylinder and to accommodate slight variations in size between the periphery of the ring and the inner periphery of the cylinder.

It may also ben seen that when the sealing ring is in its free position, it will be relatively loose within the wall 13 of the cylinder 15, so that vacuum developed upon extension of the piston will be sufficient to move the ring to open the flow passageways 33, 33.

It may further be seen that with the structure just described that since the metal ring serves both as a check valve and sealing ring the need for a separate check valve and sealing ring is abviated and close tolerances on the inner and outer sides of the working sylinder are not required, making it necessary to finish only the inside of the working cylinder.

It may further be seen that with the structure just described, the check valve passageways may all be cast in place and that the check valve and sealing ring requires a minimum of axial and radial space, resulting in economy in structure of the buffer and also accommodating air to be bled from the working chamber of the buffer without any undue loss of oil from the working chamber of the buffer.

While we have herein shown and described one form in which the invention may be embodied, it should be understood that various variations and modifications in the invention may be attained without departing from the spirit and scope of the novel concepts thereof.

We claim as our invention:

1. In a check valve and seal forming a peripheral seal and check valve between two members, a first of which members has a cylindrical interior wall and a second of which members has an external cylindrical wall spaced radially inwardly of said interior cylindrical wall and cooperating therewith to form a compression chamber, said second member having an annular groove therein opening toward said interior cylindrical wall and having flow passageways leading through said groove from one side of said second member to the other, and means seated in said groove accommodating the flow of fluid through said passageways in one direction and blocking the flow of fluid through said passageways in an opposite direction comprising:

a split metallic sealing ring of lesser width than the width of said groove, slidably mounted in said groove for sealing engagement with said interior cylindrical wall and for axial movement in a direction to admit fluid through said passageways upon the creation of a vacuum within said internal cylindrical wall and for axial movement in an opposite direction to block the flow of fluid through said passageways upon the creation of pressure on said sealing ring, the space between the adjacent ends of said split metallic sealing ring forming an air bleed passageway, and a dowel mounted on said second member and extending axially of said cylindrical walls and having loose engagement with said sealing ring, to insure the position of the gap between the adjacent ends of said ring in the top of said compression chamber to insure bleeding of air from said compression chamber.

2. The structure of claim 1, wherein the sealing ring has a narrow annular land extending outwardly therefrom in the general region of the transverse center of said ring and having sealing engagement with said interior cylindrical wall.

3. In a check valve and seal in combination with a hydraulic buffer comprising:

a cylinder, a piston within said cylinder, a reservoir having communication with said cylinder, an end closure for said cylinder, flow passageways leading axially through said end closure, accommodating the replenishment of fluid within said cylinder, and a split ring loosely mounted in said end closure for axial movement therealong and for slidable engagement with the wall of said cylinder, said split ring having sealing engagement with the wall of said cylinder and having a flow control association with said flow passageways, to accommodate the flow of fluid through said passageways in one direction and to block the back flow of fluid through said passageways in an opposite direction of travel of said piston, said split sealing ring having a gap between adjacent ends thereof providing an air bleed from said cylinder, and a dowel loosely retaining said sealing ring to said end closure and maintaining the gap between the adjacent ends of said ring at the top of said cylinder to ensure the complete bleeding of air from said cylinder.

4. The structure of claim 3, wherein the split ring has a narrow land extending radially outwardly of the periphery thereof having sealing engagement with the inner wall of said cylinder.

5. The structure of claim 3, wherein the dowell is mounted in said end closure and extends axially of said cylinder and has loose engagement with said split sealing ring to accommodate free movement of said sealing ring to open and close said flow passageways while holding the gap between the adjacent ends of said sealing ring at the top of said cylinder.

6. In a check valve and seal and in combination with a hydraulic buffer comprising:

a cylinder, a piston within said cylinder, a reservoir having communication with said cylinder, an end closure for said cylinder, said end closure having an outwardly opening annular groove spaced axially and radially inwardly of the interior wall of said cylinder and opening toward the interior wall of said cylinder, and having flow passageways opening through said annular groove into the interior of said cylinder, and a split sealing ring freely mounted in said groove for sealing engagement with the interior wall of said cylinder and movable along said groove to close said flow passageways in one direction of movement of said piston and to open said flow passageways and accommodate the flow of fluid into said cylinder in an opposite direction of movement of said piston.

7. The structure of claim 6, wherein a split sealing ring is a metal ring and hras an extends axially of said groove and has loose engagement with said split ring, to retain the gap between adjacent ends of said split ring to the top of said cylinder, to insure the complete bleeding of air from said cylinder.

8. The structure of claim 7, wherein a split sealing ring is a metal ring and has an annular land extending radially outwardly therefrom in the general region of the transverse center of said ring and having sealing engagement with said interior cylindrical wall.

References Cited

UNITED STATES PATENTS

| 2,107,974 | 2/1938 | Bechereau et al. | 188—88 |
| 2,206,110 | 7/1940 | Myers et al. | 188—88 |
| 2,614,793 | 10/1952 | Storm | 137—525 |
| 2,690,763 | 10/1954 | Seligman | 137—516.11 |
| 2,949,625 | 8/1960 | Guyer | 277—173 X |

MILTON BUCHLER, *Primary Examiner.*

G. E. HALVOSA, *Assistant Examiner.*